(12) United States Patent
Marazzani et al.

(10) Patent No.: US 9,221,716 B2
(45) Date of Patent: *Dec. 29, 2015

(54) HARDENING ACCELERATOR FOR MINERAL BINDERS

(71) Applicant: SIKA TECHNOLOGY AG, Baar (CH)

(72) Inventors: Beat Marazzani, Oberengstringen (CH); Christian Bürge, Schafisheim (CH); Christophe Kurz, Endingen (CH); Gilbert Mäder, Marthalen (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/090,511

(22) Filed: Nov. 26, 2013

(65) Prior Publication Data

US 2014/0076203 A1    Mar. 20, 2014

Related U.S. Application Data

(63) Continuation of application No. PCT/EP2012/059908, filed on May 25, 2012.

(30) Foreign Application Priority Data

May 26, 2011    (EP) .................... 11167678

(51) Int. Cl.
*C04B 24/12* (2006.01)
*C04B 28/02* (2006.01)
*C04B 103/14* (2006.01)

(52) U.S. Cl.
CPC ............. *C04B 24/121* (2013.01); *C04B 24/122* (2013.01); *C04B 28/02* (2013.01); *C04B 2103/14* (2013.01); *Y02W 30/92* (2015.05); *Y02W 30/94* (2015.05)

(58) Field of Classification Search
CPC .... C04B 24/121; C04B 24/122; C04B 18/08; C04B 18/141; C04B 28/02; C04B 2103/14
USPC .......... 106/696, 708, 727, 781, 790, 795, 808
See application file for complete search history.

(56) References Cited

U.S. PATENT DOCUMENTS

| | | | |
|---|---|---|---|
| 4,943,323 A | 7/1990 | Gartner et al. | |
| 4,990,190 A | 2/1991 | Myers et al. | |
| 5,017,234 A | 5/1991 | Gartner et al. | |
| 5,084,103 A | 1/1992 | Myers et al. | |
| 5,156,679 A | 10/1992 | Gartner et al. | |
| 5,348,583 A | 9/1994 | Arfaei et al. | |
| 5,429,675 A | 7/1995 | Cheung et al. | |
| 6,048,393 A | 4/2000 | Cheung et al. | |
| 6,290,772 B1 | 9/2001 | Cheung et al. | |
| 6,358,311 B1 | 3/2002 | Arai et al. | |
| 2004/0244655 A1 | 12/2004 | Buerge et al. | |
| 2006/0086291 A1 | 4/2006 | Jardine | |
| 2009/0050023 A1 | 2/2009 | Buerge et al. | |
| 2014/0076205 A1 | 3/2014 | Marazzani et al. | |
| 2014/0150694 A1 | 6/2014 | Marazzani et al. | |

FOREIGN PATENT DOCUMENTS

| | | |
|---|---|---|
| CN | 1107127 A | 8/1995 |
| CN | 1223235 A | 7/1999 |
| EP | 0 415 799 A2 | 3/1991 |
| EP | 1 348 729 A1 | 10/2003 |
| EP | 1 138 697 B1 | 11/2003 |
| EP | 1 061 089 B1 | 3/2004 |
| EP | 1 561 735 A1 | 8/2005 |
| KR | 10-0893585 B1 | 4/2009 |
| WO | WO 03/000617 A1 | 1/2003 |
| WO | WO 2005/123621 A1 | 12/2005 |
| WO | 2011/022217 A1 | 2/2011 |
| WO | WO 2012/160211 A1 | 11/2012 |

OTHER PUBLICATIONS

International Search Report (PCT/ISA/210) mailed on Aug. 6, 2012, by the European Patent Office as the International Searching Authority for International Application No. PCT/EP2012/059906.
Written Opinion (PCT/ISA/237) mailed on Aug. 6, 2012, by the European Patent Office as the International Searching Authority for International Application No. PCT/EP2012/059906.
International Search Report (PCT/ISA/210) mailed on Aug. 6, 2012, by the European Patent Office as the International Searching Authority for International Application No. PCT/EP2012/059904.
Written Opinion (PCT/ISA/237) mailed on Aug. 6, 2012, by the European Patent Office as the International Searching Authority for International Application No. PCT/EP2012/059904.
International Search Report (PCT/ISA/210) mailed on Aug. 6, 2012, by the European Patent Office as the International Searching Authority for International Application No. PCT/EP2012/059908.
Written Opinion (PCT/ISA/237) mailed on Aug. 6, 2012, by the European Patent Office as the International Searching Authority for International Application No. PCT/EP2012/059908.
Notification of Transmittal of Translation of International Preliminary Report on Patentability (Forms PCT/IB/338 and PCT/IB/373) and the Written Opinion of the International Searching Authority (Form PCT/ISA/237) issued on Dec. 5, 2013, by the International Bureau of WIPO in corresponding International Application No. PCT/EP2012/059908. (8 pages).
Notification of Transmittal of Translation of International Preliminary Report on Patentability (Forms PCT/IB/338 and PCT/IB/373) and the Written Opinion of the International Seaching Authority (Form PCT/ISA/237) issued on Dec. 5, 2013, by the International Bureau of WIPO in the International Application No. PCT/EP2012/059904. (7 pages).
Notification of Transmittal of Translation of the International Preliminary Report on Patentability (PCT/IB/338 and PCT/IB/373) and the Written Opinion of the International Searching Authority (Form PCT/ISA/237) issued on Dec. 5, 2013, by the International Bureau of WIPO in the International Application No. PCT/EP2012/059906. (9 pages).

(Continued)

*Primary Examiner* — Anthony Green
(74) *Attorney, Agent, or Firm* — Buchanan Ingersoll & Rooney PC

(57) ABSTRACT

A hardening accelerator for mineral binders including an amino alcohol A and/or of a salt of said amino alcohol A, for example, cementitious binders, is provided. The amino alcohol A has a structure according to formula (I) where a) $R^1$ and $R^2$, independently of one another, each represent an alkanol group including 3-4 carbon atoms, b) $R^3$ is an organic group including 1-8 carbon atoms, and c) $R^3$ is different from $R^1$ and/or $R^2$.

20 Claims, No Drawings

(56) References Cited

OTHER PUBLICATIONS

"How to Sculpt with Concrete". WikiHow. May 2, 2008 [Retrieved on Sep. 13, 2014]. Retieved from http://web.archive.org/web/20080502193504/http:/www.wikihow.com/Sculpt-With-Concrete. (2 pages).

Chinese Office Action issued in Chinese Patent Application No. 201280019835.0 dated Feb. 25, 2015, 7 pages.

Office Action issued in copending U.S. Appl. No. 14/090,639 dated Dec. 3, 2014, 9 pages.

Office Action issued in copending U.S. Appl. No. 14/090,375 dated Jun. 23, 2014, 7 pages.

Office Action issued in copending U.S. Appl. No. 14/090,375 dated Oct. 1, 2014, 18 pages.

U.S. Appl. No. 14/090,639, filed Nov. 26, 2013 naming as inventors Beat Marazzani et al.

U.S. Appl. No. 14/090,375, filed Nov. 26, 2013 naming as inventors Beat Marazzani et al.

Chinese Office Action issued in corresponding Chinese Patent Application No. 201280019856.2 dated Jan. 6, 2015, 9 pages.

HARDENING ACCELERATOR FOR MINERAL BINDERS

RELATED APPLICATION(S)

This application claims priority as a continuation application under 35 U.S.C. §120 to PCT/EP2012/059908, which was filed as an International Application on May 25, 2012 designating the U.S., and which claims priority to European Application No. 11167678.9 filed in Europe on May 26, 2011. The entire contents of these applications are hereby incorporated by reference in their entireties.

FIELD

The disclosure relates to the use of an amino alcohol and/or of a salt of an amino alcohol as hardening accelerator for mineral binders, for example, cementitious binders. The disclosure further relates to a composition containing a mineral binder and an amino alcohol as well as to a method for producing the composition. An additional aspect of the disclosure relates to a hardened molded body.

BACKGROUND INFORMATION

Hardening accelerators are used in mineral binders for hardening binder compositions after mixing with water. Hardening accelerators can be used, for example, in order to cast concrete at low temperatures or to increase the early strength of mortar or concrete compositions.

In this context, various substances can be used which accelerate the hardening of mineral binders, for example, cementitious binders. Such substances include, for example, hardening accelerators based on amino alcohols, halides, pseudohalides, nitrites, nitrates, aluminum salts, alkali hydroxides, alkaline earth hydroxides, glycols, glycerol, or α-hydroxycarboxylic acids.

WO 2003/000617 A1 (Sika AG) describes, for example, a hardening accelerator based on an alkanolamine, an inorganic nitrate, a carboxylic acid, and a polyol. Examples of amino alcohols are monoethanolamine, diethanolamine, triethanolamine, N-methyldiethanolamine, and triisopropanolamine.

However, the known hardening accelerators have various disadvantages. Thus, in the case of halides, pseudohalides, nitrites and nitrates in concrete, there is a risk of stress crack corrosion of pre-stressing steels. Alkali hydroxides, aluminum salts, glycols and glycerols often have an undesired stiffening behavior, and α-hydroxycarboxylic acids are dosage sensitive. In this regard, known amino alcohols can be more advantageous; however, they are not entirely satisfactory with regard to hardening acceleration.

Therefore, there continues to be a demand for improved hardening accelerators for mineral binders, which do not have the above-mentioned disadvantages.

SUMMARY

According to an exemplary aspect, a composition is provided, comprising: a hardening accelerator including an amino alcohol A and/or a salt of the amino alcohol A, and a mineral binder, wherein the amino alcohol A has a structure according to formula I:

wherein a) $R^1$ and $R^2$, independently of one another, each represents an alkanol group comprising 3-4 carbon atoms, b) $R^3$ is an organic residue comprising 1-8 carbon atoms, and c) $R^3$ is different from $R^1$ and/or $R^2$.

According to an exemplary aspect, a molded body, obtained from curing an exemplary composition, is provided.

According to an exemplary aspect, a method for producing an exemplary composition is provided, the method comprising mixing an amino alcohol A and/or a salt of the amino alcohol A with a mineral binder.

DETAILED DESCRIPTION

The disclosure provides an improved hardening accelerator for mineral binder compositions. The hardening accelerator according to the disclosure can make it possible to achieve, for example, higher early compressive strengths of mortar and/or concrete compositions, in comparison to known hardening accelerators.

An exemplary aspect uses an amino alcohol A of formula I:

and/or a salt of the amino alcohol A, as a hardening accelerator for a mineral binder, for example, a cementious binder, where a) $R^1$ and $R^2$, independently of one another, each represent an alkanol group comprising 3-4 carbon atoms,
b) $R^3$ is an organic residue comprising 1-8 carbon atoms, and where
c) $R^3$ is different from $R^1$ and/or $R^2$.

For example, unexpected high early compressive strengths can be achieved with the hardening accelerators according to the disclosure. Compared to a control without added hardening accelerator, the early compressive strengths can be increased after 24 hours (or 1 day) by up to 53% with the hardening accelerators according to the disclosure. In comparison to comparative amino alcohols, surprisingly significantly higher early strengths can be achieved as well with the exemplary amino alcohols A of formula I and/or their salts.

The amino alcohols A and/or their salts can be used as hardening accelerators in a great variety of mineral binders. Such binders can be, for example, cement types (CEM I, CEM II, CEM III, CEM IV, CEM V, so-called "green cements" and belite cement) such as those used for transport concrete, in-situ concrete, concrete for prefabricated parts and sprayed concrete, as well as mortar applications, such as repair mortar, grouts, spray mortars and the like.

The addition of the exemplary amino alcohols A and/or their salts has little or no negative effect on the processability of the mineral binders. Moreover, the exemplary amino alcohols A and/or their salts are also compatible with numerous other common hardening accelerating substances and process chemicals. The amino alcohols A and/or their salts can also be used exceedingly flexibly.

In addition, it has been discovered that exemplary hardening accelerators are not problematic with regard to undesired stiffening behavior of cementitious systems. Moreover, owing to the composition of the hardening accelerators according to the disclosure, it can be assumed that the risk of stress crack corrosion of pre-stressing steels in concrete structures is low when the hardening accelerators are used. Moreover, the dosage sensitivity is low in comparison to known hardening accelerators.

According to a first aspect of the present disclosure, provided is the use of an amino alcohol A and/or a salt of the amino alcohol A as a hardening accelerator for mineral binders, for example, cementious binders, wherein the amino alcohol A has a structure according to formula I:

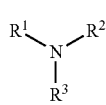

and where
a) $R^1$ and $R^2$, independently of one another, each represent an alkanol group comprising 3-4 carbon atoms,
b) $R^3$ is an organic residue comprising 1-8 carbon atoms, and
c) $R^3$ is different from $R^1$ and/or $R^2$.

The term "mineral binder" denotes, for example, a binder which reacts in the presence of water in a hydration reaction to form solid hydrates or hydrate phases. This can be, for example, a hydraulic binder (for example, a cement or a hydraulic lime), a latent hydraulic binder (for example, slag), a pozzolanic binder (for example, fly ash) or a nonhydraulic binder (gypsum or calcium lime). The term "cementitious binder" or "cementitious binder composition" here denotes, for example, a binder or a binder composition having a proportion of at least 5 wt %, for example, at least 20 wt %, for example, at least 35 wt %, for example, at least 65 wt % cement clinker. The cement clinker can be a Portland cement clinker. In the present context, cement clinker can denote a ground cement clinker.

For example, the mineral binder or the binder composition contains a hydraulic binder, for example, a cement. A cement having a cement clinker proportion of ≥35 wt % can be used. For example, the cement is of the CEM I, CEM II and/or CEM IIIA type (according to the standard EN 197-1). A proportion of the hydraulic binder in the entire mineral binder can be at least 5 wt %, for example, at least 20 wt %, for example, at least 35 wt %, for example, at least 65 wt %. According to an exemplary embodiment, the mineral binder consists of at least 95 wt % hydraulic binder, for example, cement clinker.

The binder or the binder composition can contain, or consist of, other binders. They are, for example, latent hydraulic binders and/or pozzolanic binders. Suitable latent hydraulic and/or pozzolanic binders are, for example, slag, fly ash and/or silica dust. Similarly, the binder composition can contain inert substances, such as, for example, limestone, quartz meals and/or pigments. In an exemplary embodiment, the mineral binder contains 5-95 wt %, for example, 5-65 wt %, for example, 15-35 wt % latent hydraulic and/or pozzolanic binders. Advantageous latent hydraulic and/or pozzolanic binders are slag and/or fly ash.

In an exemplary embodiment, the mineral binder contains a hydraulic binder, in particular a cement or cement clinker, and a latent hydraulic and/or pozzolanic binder, preferably slag and/or fly ash. The proportion of the latent hydraulic and/or pozzolanic binder here can be 5-65 wt %, for example, 15-35 wt %, with at least 35 wt %, for example, at least 65 wt % hydraulic binder.

The term "hardening accelerator" denotes, for example, a substance which, when added to a mineral binder and compared to a control without added substance or without hardening accelerator, leads to an increase in the early compressive strength or initial strength of the mineral binder after mixing. Such increase can be, for example, after 24 hours.

In the present context, "early compressive strength" denotes, for example, a compressive strength after 24 hours. The compressive strengths are defined, in particular, according to the standard EN 12390-3.

The expression "organic residue comprising 1-8 carbon atoms" denotes, for example, linear or branched hydrocarbon residues comprising 1-8 C atoms, which optionally can comprise one or more heteroatoms and/or optionally one or more C—C multiple bonds and/or optionally cycloaliphatic and/or aromatic proportions. As heteroatoms such as, for example, N, O, P, S and/or Si can be present.

An "alkanol group" in the present case comprises one or more hydroxyl groups on a saturated alkyl residue comprising 3-4 carbon atoms. For example, the alkanol group comprises exactly one hydroxyl group and/or 3 carbon atoms. The alkyl residue can be linear or branched here. The hydroxyl groups can be in the form of primary and/or secondary OH groups. The alkanol groups can be bound via a carbon atom to the N atom of the amino alcohol A.

$R^1$ and/or $R^2$ can stand for an isopropanol group. For example, $R^1$ and $R^2$ can each stand for an isopropanol group. Isopropanol groups can also be referred to as 2-propanol groups. In this way, for example, the advantages according to the disclosure can be particularly strongly apparent.

However, it is also possible for $R^1$ and/or $R^2$ to stand for an n-propanol group or 1-propanol group. Here it is also possible to provide amino alcohols A in which, for example, $R^1$ stands for an n-propanol group and $R^2$ 13 for an also an isopropanol group.

$R^3$ can be an alkyl group, a cycloalkyl group, an alkylaryl group, an aryl group, an alkoxy group, an alkanol group, or an aminoalkyl group. For example, $R^3$ is not an amino alcohol group.

$R^3$ can represent an alkyl group, for example, a saturated alkyl group. For example, $R^3$ can be an alkyl group comprising 1-6 carbon atoms, for example, 1-3 carbon atoms.

As has been shown, a molecular weight $M_w$ of the amino alcohol A can be in the range of 120-500 g/mol, for example, 120-300 g/mol, for example, 130-300 g/mol, for example, 140-200 g/mol. A molecular weight per alcohol group ($M_w$/OH number) of the amino alcohol A can be in the range of 60-250 g/mol, for example, 65-150 g/mol, for example, 65-100 g/mol. The molecular weights here relate to the amino alcohols A as such. The molecular weight of any counter ion in a salt of the amino alcohol A is accordingly not included in the calculation.

Amino alcohols comprising such molecular weights can have an optimal effect as hardening accelerators.

The amino alcohol A can be a β amino alcohol. This means in particular that the amine group in the first amino alcohol A is bound relative to the hydroxyl group in a β position or on a β carbon. In the case of several alcohol groups and/or amine groups, this can apply to all these functional groups. Accordingly, the hydroxyl group of the alcohol group and the nitrogen atom of the amine group are bound to two different and directly adjacent carbon atoms.

According to an exemplary embodiment, the amino alcohol A is an N-alkyl diisopropanolamine and/or a salt thereof.

An N-alkyl diisopropanolamine with an alkyl group comprising 1-6, for example, 1-3, carbon atoms is particularly advantageous.

For example, the amino alcohol A is N-methyl diisopropanolamine, N-ethyl diisopropanolamine or N-propyl diisopropanolamine. Here N-methyl diisopropanolamine is exemplary.

The amino alcohol A and/or the salt of the amino alcohol A can be used, for example, as a pure substance, for example, with a purity of ≥95 wt %.

For example, the amino alcohol A and/or the salt of the amino alcohol A is/are used in liquid form, for example, as a solution or dispersion. Aqueous solutions and/or dispersions can be used comprising a proportion of the amino alcohol A and/or of the salt of 5-99 wt %, for example, 20-70 wt %, for example, 40-60 wt %. In this manner, an optimal mixing is achieved.

The amino alcohol A and/or the salt of the amino alcohol A can also be used in solid form, for example, as a powder and/or applied to a solid support material.

According to an advantageous variant, a salt of the amino alcohol A is used. Suitable are, for example, salts with sulfuric acid, nitric acid, phosphoric acid, carbonic acid, sodium dihydrogen phosphate, sodium hydrogen carbonate, sulfaminic acid, hydrochloric acid and/or organic acids comprising $C_1$-$C_4$ per carbonic acid group, such as, for example, formic acid, tartaric acid, lactic acid, citric acid and/or oxalic acid. Exemplary are salts of carboxylic acids comprising $C_1$-$C_3$ per carboxylic acid group, for example, acetic acid. The salt of the amino alcohol A can here also be used in combination with pure or neutral amino alcohol A.

In another advantageous embodiment, the amino alcohol A is used as such. In this case, the amino alcohol A is not a salt. This can facilitate the use of the amino alcohol A.

For example, the amino alcohol A and/or its salt is/are used in a quantity of 0.01-5 wt %, for example, 0.05-2 wt %, for example, 0.05-0.6 wt % with respect to the weight of the mineral binder. As has been shown, in the case of such proportions, a particularly large increase of the early strength can be reached. However, other proportions are also possible.

According to an exemplary embodiment, the amino alcohol A and/or its salt is/are used in combination with at least one additional hardening accelerating substance.

A plurality of substances known to the person skilled in the art can be used here. The additional hardening accelerating substance can comprise one or more of the following representative substances:
a) one or more additional amino alcohols and/or salts thereof, which differ in particular from the respective amino alcohol A used;
b) one or more alkali and/or alkaline earth nitrates;
c) one or more alkali and/or alkaline earth nitrites;
d) one or more alkali and/or alkaline earth thiocyanates;
e) one or more α-hydroxycarboxylic acids;
f) one or more alkali and/or alkaline earth halides;
g) glycerol and/or glycerol derivatives;
h) one or more glycols and/or glycol derivatives;
i) one or more aluminum salts;
j) one or more alkali and/or alkaline earth hydroxides.

Exemplary amino alcohols A and/or salts are in general satisfactorily compatible with these representatives of additional acceleration hardening substances. In this manner, it is possible, for example, to achieve a flexible adaptation to special uses.

As further hardening accelerating substance, additional amino alcohols can be well suited, such as, for example, N-ethyldiethanolamine (EDEA), triethanolamine (TEA), 2-(diisopropylamino)ethanol, 2-(2-aminoethylamino)ethanol, N,N'-bis-(2-hydroxyethyl)ethylenediamine, N-methyldiethanolamine (MDEA), diethanolamine (DEA), 2-amino-2-methyl-1,3-propanediol (AMPD), tris(hydroxymethyl)aminomethane (TRIS), 3-amino-1,2-propanediol (APD) and/or 2-(2-aminoethoxy)ethanol.

Examples of additional amino alcohols are tris(hydroxymethyl)aminomethane (TRIS), N-methyldiethanolamine (MDEA), diethanolamine (DEA), and/or 2-amino-2-methyl-1,3-propanediol (AMPD). Examples are tris(hydroxymethyl)aminomethane (TRIS) and/or N-methyldiethanolamine (MDEA).

The amino alcohol A and/or its salt can be used in combination with at least one additive, for example, a concrete additive and/or a mortar additive. The at least one additive comprises, for example, a defoaming agent, a dye, a preservative, a liquefier, a retarding agent, an air pore forming agent, a shrinkage reducing agent and/or a corrosion inhibitor or combinations thereof.

The at least one additive can contain a liquefier. The latter contains, for example, a polycarboxylate, for example, a polycarboxylate ether. For example, the liquefier is a comb polymer comprising a polycarboxylate backbone with polyether side chains bound to it. The side chains can be bound to the polycarboxylate backbone via ester, ether and/or amide groups.

Corresponding polycarboxylate ethers and manufacturing methods are disclosed, for example, in EP 1 138 697 B1 on page 7, line 20 to page 8, line 50, as well as in the examples thereof or in EP 1 061 089 B1, on page 4, line 54 to page 5, line 38 as well as in the examples thereof. As described in EP 1 348 729 on page 3 to page 5 as well as in the examples thereof, the comb polymer can be produced in the solid aggregate state. The disclosure of the above documents are incorporated by reference herein.

Such comb polymers are also marketed commercially by Sika Schweiz AG under the commercial name series ViscoCrete®.

If present, the liquefier can constitute a proportion of 0.01-6 wt %, for example, 0.1-4 wt %, for example, 0.5-3 wt %, with respect to the mineral binder. Owing to the combination with the liquefier, the processability of the binder composition can be improved and at the same time higher compressive strengths are achieved. As has been shown, the liquefier has hardly any influence or no influence at all on the effect of the hardening accelerator.

The amino alcohol A and/or its salt can be added before or during the mixing to the mineral binder.

For example, the amino alcohol A and/or its salt can be admixed to the mixing water and added with the latter to the mineral binder during the mixing. It is also possible to mix the amino alcohol A and/or its salt directly with the mineral binder before mixing, and to add the mixing water only subsequently. The addition of the mixing water can here also occur with a time delay, for example, hours, days, or even months later.

According to an exemplary embodiment, the amino alcohol A and/or its salt is/are added to the mineral binder before and/or during a process of grinding the mineral binder. As a result, for example, the amino alcohol A and/or the salt thereof is/are mixed particularly satisfactorily with the mineral binder, and an additional mixing process is omitted. Surprisingly, it was found that the effect of the amino alcohol A is not affected by the grinding process. The grinding process here refers to a method in which a mean particle size of the mineral binder is reduced. This occurs, for example, in a cement mill during the milling of cement clinker, optionally together with inactive substances, latent hydraulic binders and/or pozzolanic binders. For example, the mineral binder in the grinding process is ground to a Blaine fineness of at least 500 cm²/g, for example, at least 1000 cm²/g, for example, at least 2000 cm²/g, for example, at least 2500 cm²/g.

An additional aspect of the present disclosure relates to a composition containing a mineral binder and an amino alcohol A of formula I and/or a salt thereof, as described above. The binder can be, for example, in a dry form or in the form of a binder composition, which has been made fluid with mixing water or stiffened.

The amino alcohol A and/or its salt here is/are advantageously in a quantity of 0.01-5 wt %, for example, 0.05-2 wt %, for example, 0.05-0.6 wt %, with respect to the weight of the mineral binder.

In addition, an additive as described above is advantageously present. The additive can comprise a liquefier, for example, a polycarboxylate ether. If present, the liquefier can include a proportion of 0.01-6 wt %, for example, 0.1-4 wt %, for example, 0.5-3 wt %, relative to the mineral binder.

In an additional exemplary embodiment, the composition contains additional solid aggregates, for example, gravel, sand and/or aggregates. Corresponding compositions can be used, for example, as mortar mixtures or concrete mixtures.

For example, the composition in addition contains water, wherein a weight ratio of water to mineral binder can be in the range of 0.25-0.8, for example, 0.3-0.6, for example, 0.35-0.5. Such binder compositions can be processed directly as mortar mixtures or concrete mixtures.

An additional aspect of the present disclosure relates to a molded body which can be obtained by curing a binder composition as described above after the addition of water. The molded body so produced can here be of almost any shape, and it can be, for example, a component of a structure, such as, for example, a building, masonry or a bridge.

Moreover, the present disclosure relates to a method for producing a mineral binder composition. Here, an amino alcohol A according to formula I, as described above, is mixed with a mineral binder, for example, a cementitious mineral binder. The mineral binder can here be present as described above, and, for example, it can contain the above-mentioned latent hydraulic and/or pozzolanic binders.

EXAMPLES

1. Substances and Methods Used 1.1 Amino Alcohols

The following amino alcohols are used for the embodiment examples (Table 1):

TABLE 1

| Acronym | Substance | CAS No. | Application form |
|---------|-----------|---------|------------------|
| MDiPA | N-Methyl diisopropanolamine | 4402-30-6 | Pure substance |
| DiPA | Diisopropanolamine | 110-97-4 | 50 wt % in $H_2O$ |
| TiPA | Triisopropanolamine | 122-20-3 | 50 wt % in $H_2O$ |
| TEA | Triethanolamine | 102-71-6 | Pure substance |
| MDEA | N-Methyl diethanolamine | 105-59-9 | Pure substance |
| AMPD | 2-Amino-2-methyl-1,3-propanediol | 115-69-5 | 50 wt % in $H_2O$ |

All the substances listed in Table 1 are commercially available from various suppliers in pure form (purity>97%).

DiPA, TiPA and AMPD that are solid or highly viscous in pure form were used in the form of aqueous solutions with the proportions of pure substance indicated in Table 1.

1.2 Preparation of the Hardening Accelerators

The hardening accelerators were admixed in each case to the mixing water for the mortar mixtures, which were subsequently used for mixing the mortar mixtures.

1.3 Additional Additives

In some of the mortar tests described below, a modified polycarboxylate in the form of Sika® ViscoCrete®-3081 S was used as liquefier. Sika® ViscoCrete®-3081 S is a comb polymer having a polycarboxylate backbone and polyalkylene oxide side chains bound via ester groups. If a liquefier was used, it was admixed at a concentration of 1.0 wt % relative to the binder, and it was admixed, like the amino alcohols, to the mixing water in advance.

1.4 Mortar Mixtures

The effectiveness of the hardening accelerators according to the disclosure was tested in mortar compositions.

The mortar mixtures have the dry compositions described in Table 2.

TABLE 2

| | | Mortar mixture | | |
|---|---|---|---|---|
| | | M1 | M2 | M3 |
| Component | Portland cement CEM I 42.5 N Blaine fineness: 3600 cm²/g | 750 g | 525 g | 525 g |
| | Fly ash Blaine fineness: 3900 cm²/g | 0 g | 225 g | 0 g |
| | Slag Blaine fineness: 3000 cm²/g | 0 g | 0 g | 225 g |
| | Limestone filler | | 141 g | |
| | Sand 0-1 mm | | 738 g | |
| | Sand 1-4 mm | | 1107 g | |
| | Sand 4-8 mm | | 1154 g | |

As cement, a Portland cement of type CEM I42.5 N (Normo 4; available from Holcim Schweiz) with a Blaine fineness of 3600 cm²/g was used. If used, fly ash of the type Safament (SAFA Saarfilterasche-Vertriebs GmbH & Co. KG) or slag of the Löruns type (GBFS; Voestalpin Stahl GmbH, Austria) was used.

For the mixing of the mortar mixtures, the sand, the limestone filler, the cement and optionally the fly ash or the slag was mixed in the dry state for 1 minute in a Hobart mixer. Within 30 seconds, the mixing water, in which the liquefier (1.0 wt % with respect to the binder) and optionally the hardening accelerator had been dissolved or dispersed, was added and mixed for an additional 2.5 minutes. The total wet mixing time was 3 minutes in each case. If a liquefier was used, the water/cement value (w/z value) was 0.4. Without liquefier, the water/cement value (w/z value) was 0.52.

1.5 Test Procedure

For the determination of the effectiveness of the amino alcohols, the compressive strength of mortar mixtures was determined 24 h hours (1 day, "1 d") after the mixing of the mortar mixtures. Subsequently, after the mixing of the mortar mixtures, the respective flow table spread (FTS) was also measured.

The test for the determination of the compressive strength (in N/mm²) was carried out using prisms (40×40×160 mm) according to the standard EN 12390-1 to 12390-4. The flow table spread (FTS) of the mortar was determined according to EN 1015-3.

2. Mortar Tests

The amino alcohols mentioned in section 1.1 were used at different dosages as hardening accelerators in different mortar mixtures.

Subsequently, as described above (section 1.4), the pressure resistance as well as the flow table spread of the respective mortar mixtures was determined. For comparison purposes, in each case a reference sample was measured, which contained no hardening accelerator or amino alcohol (dosage=0 wt %), but otherwise had an identical composition compared to the remaining mortar tests.

Table 3 provides an overview of the effect of MDiPA in the mortar mixtures M1, M2 and M3 at different dosages. The mortar tests were carried out here without the addition of a liquefier and they were carried out at a w/z value of 0.52. The flow table spread immediately after the mixing of the mortar mixtures was in the range of 165-175 mm. The dosages relate to the total binder content (cement plus optionally fly ash or slag). The "1 d strength" columns indicate the measured pressure resistances after 1 day or 24 hours. The "Δ" columns give the compressive strength increases in comparison to the reference samples without MDiPA (dosage=0 wt %).

TABLE 3

| Dosage MDiPA [wt %] | M1 1 d strength [MPa] | Δ [%] | M2 1 d strength [MPa] | Δ [%] | M3 1 d strength [MPa] | Δ [%] |
|---|---|---|---|---|---|---|
| 0 | 9.7 | 0 | 7.2 | 0 | 6.6 | 0 |
| 0.05 | 12.0 | 24 | 7.9 | 10 | 9.4 | 42 |
| 0.15 | 13.6 | 40 | 10.2 | 42 | 9.3 | 41 |
| 0.50 | 14.8 | 53 | 9.8 | 36 | 9.0 | 36 |
| 1.50 | 14.6 | 51 | 8.2 | 14 | 6.9 | 5 |

It is apparent from Table 3 that MDiPA, as representative of an exemplary amino alcohol A, produces excellent 1-day compressive strength increases of up to 53%, in mortar mixtures with Portland cement as the sole binder (mortar mixture M1), and also in mortar mixtures with binders based on Portland cement/fly ash mixtures (mortar mixture M2) and Portland cement/slag mixtures (mortar mixture M3). The optimal concentrations or concentrations of best effectiveness are here relatively low with 0.50 wt % (mortar mixture M1) or 0.15 wt % (mortar mixtures M2 and M3), which is interesting from the economic and environmental toxicological viewpoint.

Table 4 shows the effect of various amino alcohols in mortar mixtures of type M1. All the mortar tests that are the basis of the results in Table 4 were carried out here without the addition of a liquefier and with a w/z value of 0.52. For each amino alcohol, in Table 4, in each case the optimal dosage ("dosage" column) is indicated, which yields the greatest compressive strength increase for the respective amino alcohol. The optimal dosages were determined as with MDiPA (Table 2) on the basis of test experiments, which were carried out for each amino alcohol at different dosages. The "Δ" column indicates the percentage increases of compressive strength associated with the optimal dosage, in comparison to a reference sample without amino alcohol or hardening accelerator (dosage=0 wt %). The flow table spread immediately after the mixing of the mortar mixtures at the optimal dosages of the amino alcohols was within the range of 172-180 mm.

The dosages again relate to the total binder content (cement plus optionally fly ash or slag). In the case of DiPA, TiPA and AMPD, the dosages relate in addition to the solutions mentioned in section 1.1, and in the case of the remaining alcohols they relate to the respective undiluted substance in pure form (purity>97%).

TABLE 4

| Amino alcohol | Dosage [wt %] | Δ [%] |
|---|---|---|
| Without | 0 | 0 |
| MDiPA | 0.50 | 53 |
| DiPA | 1.50 | 21 |
| TiPA | 0.40 | 23 |
| TEA | 0.15 | 15 |
| MDEA | 0.05 | 21 |
| AMPD | 0.5 | 21 |

The mortar tests which are the basis of the results in Table 5 correspond substantially to the mortar tests carried out in connection with Table 4. In the case of the mortar tests associated with Table 5, however, Sika® ViscoCrete®-3081 S was admixed in each case as liquefier (1.0 wt %, with respect to the binder content) and the w/z ratio was decreased to 0.40. The flow table spread immediately after the mixing of the mortar mixtures, at optimal dosages of the amino alcohols, was in the range of 191-215 mm.

TABLE 5

| Amino alcohol | Dosage [wt %] | Δ [%] |
|---|---|---|
| Without | 0 | 0 |
| MDiPA | 0.20 | 37 |
| DiPA | 1.0 | 32 |
| TiPA | 1.0 | 32 |
| TEA | 0.05 | 10 |
| MDEA | 0.15 | 21 |
| AMPD | 1.5 | 27 |

As one can see from Tables 4 and 5, the use of the exemplary amino alcohols, with or without the addition of liquefiers, in comparison to other amino alcohols, leads to uniquely high compressive strength increases after 1 day or 24 hours. The measured values for the flow table spread show, in addition, that correspondingly accelerated mortar mixtures at the same time are also easy to process.

The above-described embodiments should be understood only as illustrative examples, which can be modified as desired within the scope of the disclosure.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A composition, comprising:
   a hardening accelerator including an amino alcohol A and/or a salt of the amino alcohol A, and
   a mineral binder,
   wherein the amino alcohol A has a structure according to formula I:

(I)

wherein
a) $R^1$ and $R^2$, independently of one another, each represents an alkanol group comprising 3-4 carbon atoms, and
b) $R^3$ represents an alkyl group.

2. The composition according to claim 1, wherein $R^1$ and/or $R^2$ stand(s) for an isopropanol group.

3. The composition according to claim 1, wherein the amino alcohol A is an N-alkyl diisopropanolamine.

4. The composition according to claim 1, wherein the amino alcohol A is N-methyl diisopropanolamine, N-ethyl diisopropanolamine or N-propyl diisopropanolamine.

5. The composition according to claim 1, wherein the amino alcohol A is N-methyl diisopropanolamine.

6. The composition according to claim 1, wherein the amino alcohol A and/or its salt is used in a quantity of 0.01-5 wt %, with respect to the weight of the mineral binder.

7. The composition according to claim 1, wherein the amino alcohol A and/or its salt is used in combination with at least one additional hardening accelerating substance.

8. The composition according to claim 1, wherein the mineral binder contains at least 5 wt % of a hydraulic binder.

9. The composition according to claim 1, wherein the mineral binder contains 5-95 wt % of a latent hydraulic and/or pozzolanic binder.

10. The composition according to claim 1, wherein the amino alcohol A and/or its salt is/are added to the mineral binder before and/or during a process of grinding the mineral binder.

11. The composition according to claim 1, wherein the mineral binder is a cementitious binder.

12. The composition according to claim 1, wherein $R^3$ represents an alkyl group comprising 1-6 carbon atoms.

13. The composition according to claim 1, wherein $R^3$ represents an alkyl group comprising 1-3 carbon atoms.

14. The composition according to claim 1, wherein the amino alcohol A and/or its salt is used in a quantity of 0.05-2 wt %, with respect to the weight of the mineral binder.

15. The composition according to claim 1, wherein the mineral binder contains at least 35 wt % of a hydraulic binder.

16. The composition according to claim 8, wherein the hydraulic binder is cement.

17. The composition according to claim 1, wherein the mineral binder contains 5-65 wt % of a latent hydraulic and/or pozzolanic binder.

18. The composition according to claim 9, wherein the latent hydraulic and/or pozzolanic binder is slag and/or fly ash.

19. A molded body, obtained from curing the composition according to claim 1.

20. A method for producing the composition according to claim 1, the method comprising mixing an amino alcohol A and/or a salt of the amino alcohol A with a mineral binder.

* * * * *